Dec. 31, 1929.  J. COLYN  1,741,614
BULB PLANTING DEVICE
Filed April 21, 1927   4 Sheets-Sheet 1

INVENTOR
John Colyn
BY
ATTORNEY

Dec. 31, 1929.  J. COLYN  1,741,614
BULB PLANTING DEVICE
Filed April 21, 1927  4 Sheets-Sheet 3

INVENTOR
John Colyn
BY
ATTORNEY

Dec. 31, 1929.                    J. COLYN                       1,741,614
                              BULB PLANTING DEVICE
                            Filed April 21, 1927           4 Sheets-Sheet 4

INVENTOR
John Colyn
BY
ATTORNEY

Patented Dec. 31, 1929

1,741,614

UNITED STATES PATENT OFFICE

JOHN COLYN, OF CHEHALIS, WASHINGTON

BULB-PLANTING DEVICE

Application filed April 21, 1927. Serial No. 185,596.

My invention relates to a bulb planting device. More particularly my invention relates to a device for causing bulbs to be deposited in a furrow right side up.

For purposes of clearness and definiteness of illustration I will describe my invention as applied to the planting of narcissus bulbs, but it will be distinctly understood that my invention is not limited to any such specific application, but is co-extensive to all fields involving like conditions and problems. The planting of narcissus bulbs has been done heretofore by hand exclusively. An important condition in the planting of bulbs is that they be planted with the root side down and in certain spaced relation to each other; also a fundamental requisite is that the bottom of the furrow be of a given predetermined depth from the surface so as to provide a uniform amount of covering for each bulb. These conditions heretofore have been met only by hand planting. A serious objection to the manual planting is the great cost because it is exceedingly slow. A primary object of my invention is to provide a device which will cause the bulbs to be removed from a hopper magazine and deposited in a furrow right side up and means to cover the bulb with a uniform depth of covering.

Furthermore, a purpose of my invention is to provide a vertically disposed bulb feeding spout which is clear of obstructions, so that the bulb may right itself therein while descending therethrough. Also I purpose providing a bulb planting device in which the bulbs are supplied individually to a vertically disposed bulb feeding spout by causing the bulb to be thrown or cast into said spout so that it is free throughout the length of said spout to right itself therein.

Finally, I purpose providing a bulb planting device which has means to open the furrow, means to deposit the bulb right side up in said furrow, and means to cover said bulbs so that in every operation the planting of the bulbs is performed mechanically.

In general, the underlying fact of my invention is that I have discovered that one end of the bulb is heavier than the other end, and have taken advantage of this characteristic of bulbs as well as of their contour and form to cause them to assume an upright position with the roots downwardly while descending through a bulb feeding spout.

The above mentioned general objects of my invention together with others inherent in the same, are attained by the device illustrated in the following drawings, the same being a preferred exemplary form of embodiment of my invention, throughout which drawings like reference numerals indicate like parts:

Figure 1:
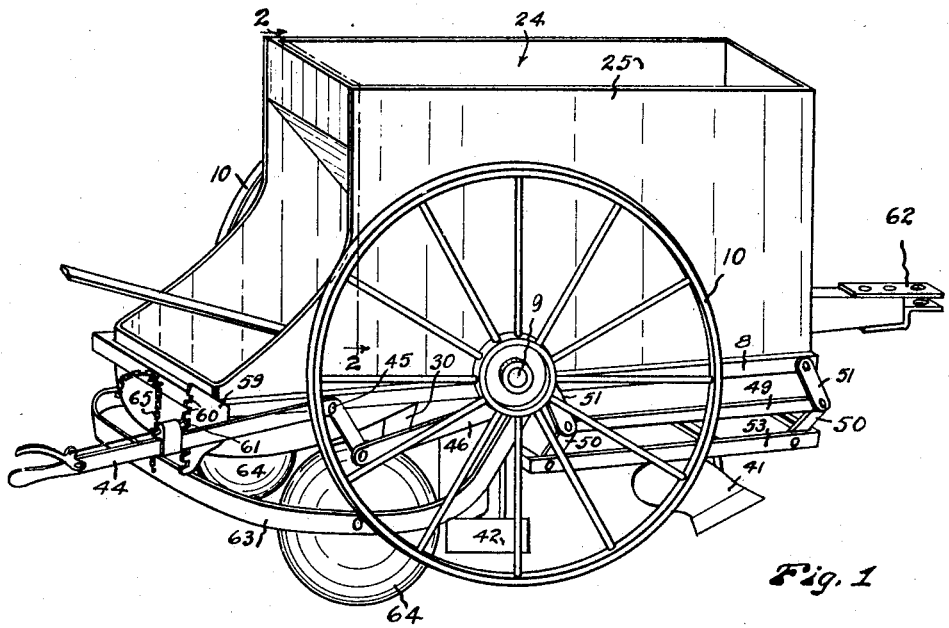
Figure 1 is a view in perspective of the device embodying my invention.
Figure 2:
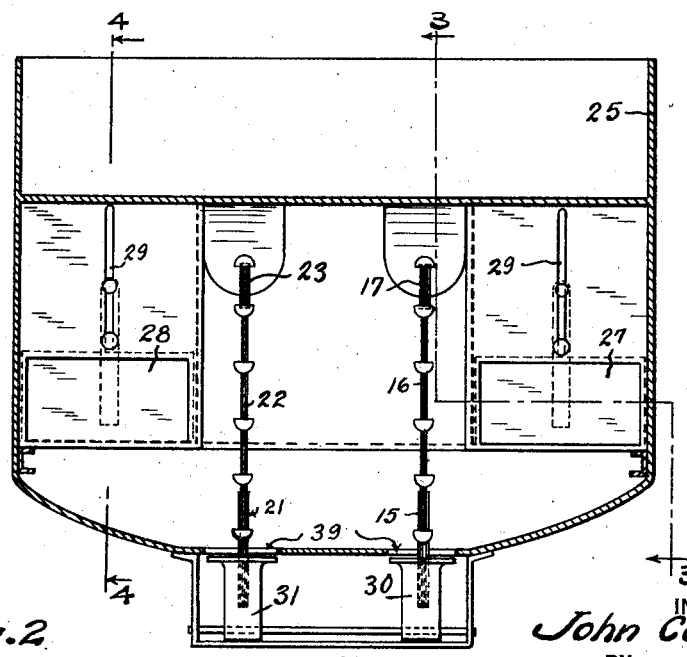
Fig. 2 is a view of the rear end of a device embodying my invention on dotted line 2, 2 of Fig. 1.
Figure 3:
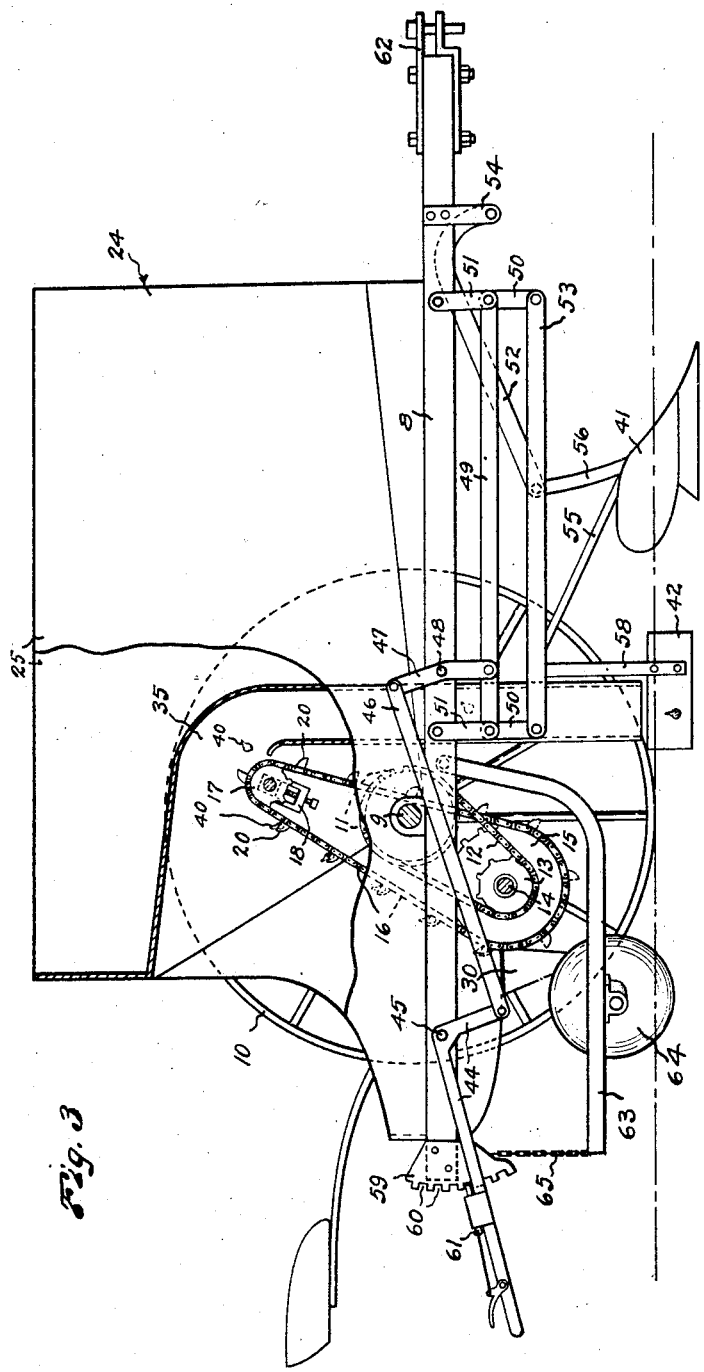
Fig. 3 is a view in longitudinal section of a device embodying my invention on dotted line 3, 3 of Fig. 2.
Figure 4:
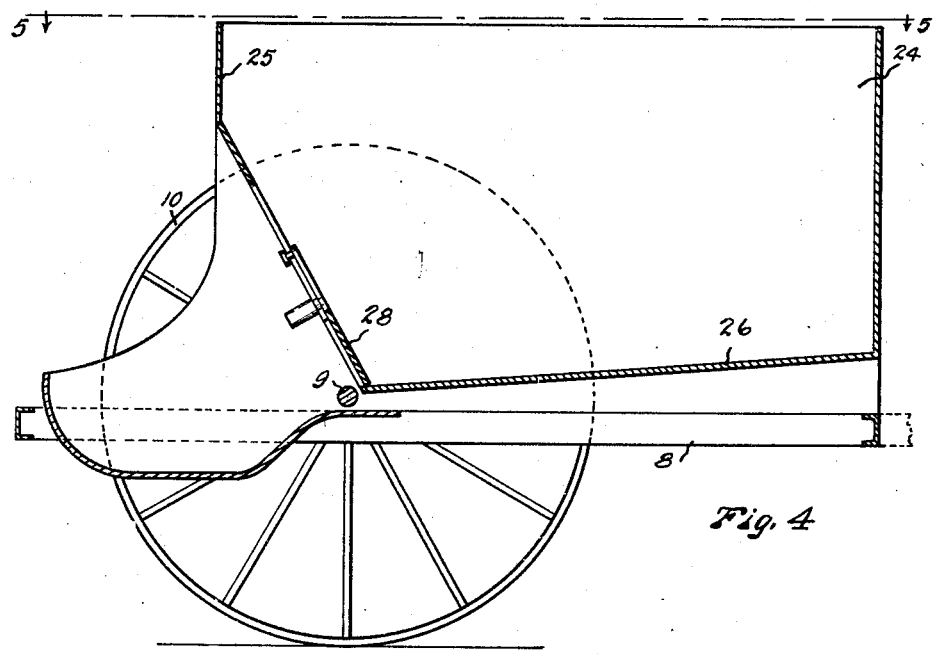
Fig. 4 is a longitudinal sectional view on dotted line 4, 4 of Fig. 2.
Figure 5:
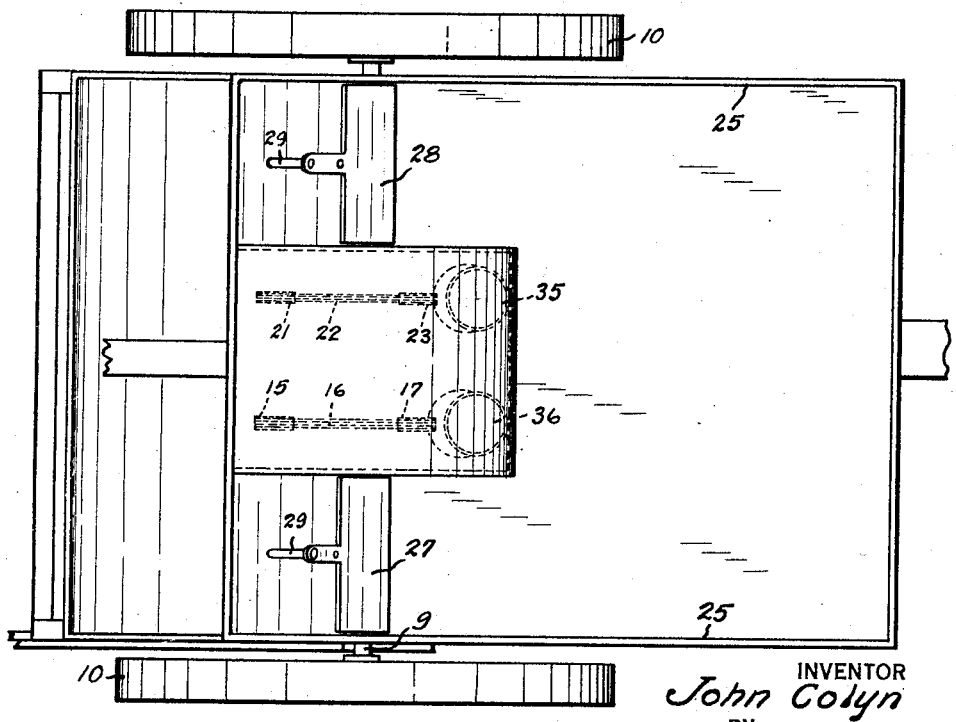
Fig. 5 is a plan view of said device.
Figure 6:
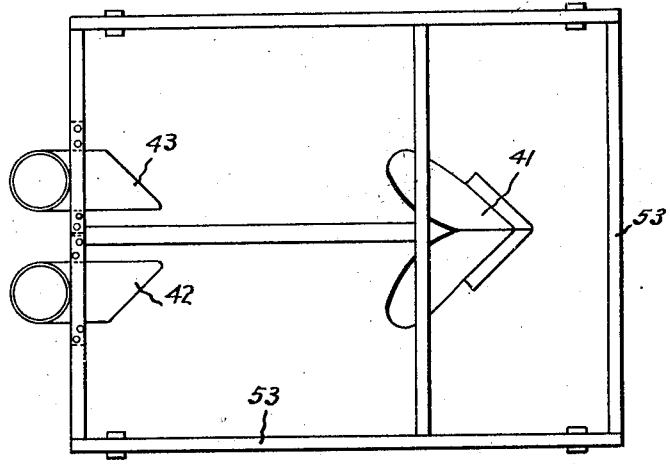
Fig. 6 is a plan view of the plow frame member with plow and shoes mounted thereon.
Figure 7:
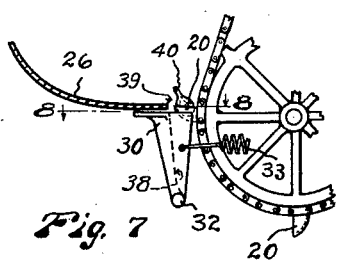
Fig. 7 is an enlarged view of the shutter and associated parts of my invention.
Figure 8:
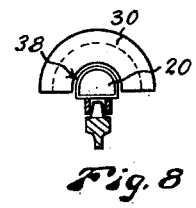
Fig. 8 is a view in section on dotted line 8, 8 of Fig. 7.
Figure 12:
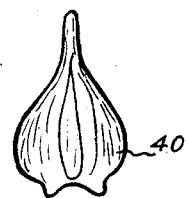
Fig. 12 is a drawing of the form of the bulb.

The frame 8 of the chassis has mounted thereon the axle 9 on which are mounted wheels 10. A sprocket wheel 11 is keyed to axle 9. A sprocket chain 12 operatively connects a sprocket wheel 13 to sprocket 11. Sprocket wheel 13 is idly mounted to shaft 14 on which is fixedly mounted sprocket feed wheel 15. Bulb feeding chain 16 operatively connects sprocket feed wheel 15 to idler sprocket wheel 17. Adjusting means 18 is provided to adjust the tightness of the feed chain 16. A clutch means 19 functions to connect the shaft 14 to the sprocket wheel 13, thereby causing sprocket wheel 15 to revolve. The sprocket feed chain 16 has buckets 20 secured thereto at spaced intervals, the space between which buckets of course determines the spacing of the bulbs in the ground. The sprocket feed wheel 15, the sprocket feed chain 16, the idler sprocket feed chain wheel 17 have their duplicates on the opposite side of the machine in feed sprocket wheel 21, sprocket feed chain 22, idler sprocket feed wheel 23 respectively, so that two rows of bulbs may be planted simultaneously.

A bulb hopper 24 having side walls 25 and sloping floor 26, provide a compartment for the supply of bulbs. The sloping floor 26 extends rearwardly downwardly so that the bulbs flow from each side of the device to outlets adjacent the path of the feed chain 16. Slides 27 and 28 operatively disposed in slots 29 provide for regulating the flow of bulbs provided in my bulb planting device.

It will be understood that the walls of the hopper at each end of the slides 27 and 28 are left smooth by the mounting illustrated so that there is no interruption of the flow of the bulbs through said passageway, so far as any mounting groove is concerned, and there is no recess that is subject to becoming clogged.

The floor 26 converges to the shutters 30 and 31, which shutters are pushed into open position by the buckets 20. The shutter 30 is rotatably mounted on shaft 32 and is actuated towards closed position by spring 33, which, as respects one end, is secured to said shutter 30, and the other end is secured to the bracket 34 which serves to mount the bulb feed spouts 35 and 36. The upper end of the bulb feed spout 35 is disposed in operative position with respect to the idler sprocket 17. A similar shutter 31 is provided for the sprocket feed chain 22. The shutters 30 and 31 have a longitudinally disposed groove 38 into which the rising bucket 20 may extend and push back the shutter so as to open a port 39 in the sloping floor 26 so that a bulb 40 may drop into said opening upon a bucket 20.

Figure 9:
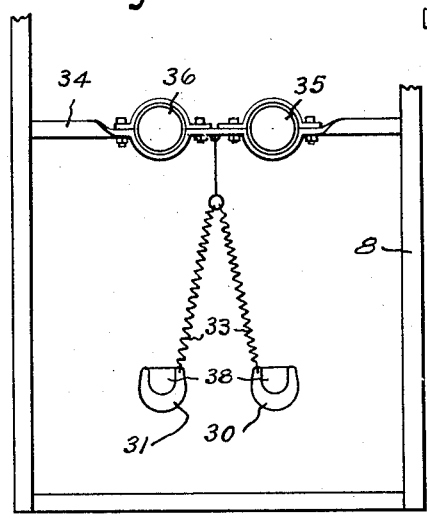
Fig. 9 is a view of the spout holding bracket.
Figure 10:
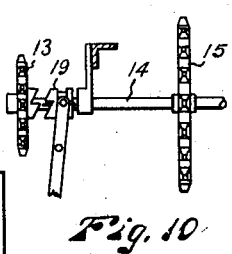
Fig. 10 is a view of the clutch means and associated parts.
Figure 11:
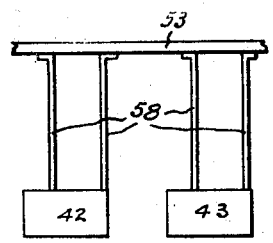
Fig. 11 is a view of shoe supporting brackets.

A double-shovel plow 41 and the two shoes 42 and 43, i. e. one for each bulb feeding spout, are adjustably mounted by means of plow frame 53 as respects the frame 8, so that they may be raised and lowered as desired. The means for raising and lowering the said breaking plow member and said shoe are as follows:

An angle lever member 44 is pivotally mounted at 45. To this is pivotally secured a connecting rod 46, which is pivotally mounted at its opposite end to a pivotally mounted lever 47 having fulcrum point at 48. Lever 47 is pivotally connected to rod 49. Depending links 51 connect rod 49 to frame 8. Links 50 connect plow frame 53 to rod 49. Link 52 pivotally connects plow frame 53 to bracket 54 on frame 8 on each side of the device, (said plow frame 53 being a rectangular frame, see Fig. 9).

The plow member 41 is rigidly connected to the frame 53 by brackets 55 and 56. Brackets 58 are rigidly mounted on frame 53 to support shoes 42 and 43. Lever 44 is operatively disposed with respect to segment 59 which has notches 60 in it which may be engaged by locking means 61 carried by the lever so that the angular position of lever 44 may be fixedly secured.

The frame 8 has connector means 62 adapted to receive the drawbar of a tractor (not illustrated).

The frame 63 pivotally mounted to the rear end portion of the frame 8 provides mounting means for the covering disks 64. This frame may be held in elevated position by any means, such as a chain 65 which is secured to the said disk mounting frame at one end and may be adjustably secured to the end of frame 8 to maintain said disk frame in elevated position.

The mode of operation of the device embodying my invention is as follows:—

With the shoe members 42 and 43 and the plow member 41 in elevated position so as to not contact the ground, the bulb planting device herein described embodying my invention is drawn by any suitable means such as a tractor to the prepared field which is to be planted with bulbs. Thereupon by means of the lever 44 the plow and shoe members are lowered to a level below the surface of the ground representing the depth at which the bulbs are to be planted. The dotted lines graphically show the position of the links when the shoe and plow members are in elevated position, and the mode of operation of said link mechanism.

The bulb hopper 24 is filled with bulbs, then the machine is started forward. Obviously the plow member 41 will cause a furrow to be made and the shoe members 42 and 43 following close in the wake of the plow member supplies a smooth bottom to the furrow and keeps the dirt from falling in from the sides so that the bulb in descending through the bulb feed spouts 35 and 36 fall into a clean furrow.

The clutch device 19 is then moved into position, the driving sprocket wheel 11 which actuates chain 12 of sprocket wheel 13 is in motion at all times when the wheels 10 are in motion. Thereupon, the clutch device 19 is moved into position to connect the sprocket feed wheel 15 to the sprocket wheel 13 through shaft 18 so that the chain 16 is set in motion. As the buckets 20 come round their outer edge engages the groove 38 and forces the shutter 30 (same operation for shutter 31) rearwardly. The sloping floor 26 causes the bulb to automatically fall upon the shutters 30 and 31, slides 27 and 28 having been moved upwardly. When the shutters are thus forced rearwardly by the rising bucket 20, the bulb falls into the bucket 20 and is carried upwardly one by one as the buckets are of a size to carry a single bulb. The rate of travel of bulb feed chain 16 is such as to cause the bulb to be thrown clear of the chain and its buckets into the vertically disposed bulb feeding spouts 35 and 36.

In practice it has been found that when the rate of travel of the chain 16 is about twice the speed of the wheel 10 a very satisfactory ratio is provided. The bulb being heavier on its root end, as well as its form, tends to right itself in its fall through the spouts 35 and 36. Moreover, the relative size of the spouts 35 and 36 and the bulb, as well as the form of the bulb, tends to create an air pressure in the spouts which co-operates with the difference in weight of the ends of the bulb to make the bulb right itself and be deposited in the furrow right side up, i. e., with the root end on the ground.

It will be understood that after the shutter has been forced back by a given bucket, the forked springs 33 promptly pull the shutters forwardly which closes the opening in the sloping floor and prevents any bulbs being lost, and the shutter remains closed until forced into open position by the next succeeding bucket.

A single furrow is provided by the plow member 41 but of such a width that two rows of bulbs may be planted therein in the manner as has been described.

After the bulb is positioned in the furrow, the cover disk 64 throws the earth about the bulbs and thus the planting operation is made complete from the opening of the furrow to the planting of the bulbs and covering thereof.

The efficiency of the device embodying my invention readily appears when it is noted that experience has taught that it requires twelve men and two horses working for one day to plant one ton of bulbs, i. e., to open the furrow, place the bulbs manually and cover the same, while two men with the device embodying my invention and a tractor, are enabled to plant eight tons in the same time, that is, one day.

Furthermore, an important advantage of planting with the device embodying my invention is that there is a uniformity of loose earth about the bulb as distinct from the situation obtaining where the bulbs are planted manually. When planted by hand so that the bulb is pressed downwardly to the root end is compressed very hard, with the result that the tender roots upon starting immediately have to pierce this hard compressed soil while they are at a very delicate stage of development.

When planting by hand it is highly important that due regard be made to the character of the soil, i. e., whether it is damp or dry. When it is damp, greater care is required to prevent undue pressing of the soil when the bulb is pushed into place than is required when the soil is dry. In planting with the device embodying my invention it is not necessary to consider the degree of dampness which obtains in the soil as at no time is there any pressing of the soil beneath the bulb.

Obviously changes may be made in the form, dimensions and arrangement of the parts of my invention, without departing from the principle thereof, the above setting forth only a preferred form of embodiment.

I claim:

1. In a device of the class described, a bulb hopper having a discharge port therein; a shutter yieldingly held beneath said port and forming the hopper floor so far as said port is concerned, said shutter being normally in closed position; a bulb feed chain having bulb buckets secured thereon at spaced intervals, said buckets being operatively disposed with respect to said shutter, pressing back said shutter to permit said buckets to pass through said port and receive a bulb; and a bulb spout vertically mounted and operatively disposed with respect to the upper end of said feed chain whereby said chain may cast the bulbs periodically into the upper end of said spout without the chain itself passing through said spout, said spout being smooth and free of projections whereby the bulb is unobstructed during its descent therein.

2. In a device of the class described, a bulb hopper having a discharge port therein; a shutter pivotally mounted and yieldingly held beneath said port and forming the hopper floor so far as said port is concerned, said shutter being normally in closed position; a bulb feed chain having bulb buckets secured thereon at spaced intervals, said buckets being operatively disposed with respect to said shutter, pressing back said shutter to permit said buckets to pass through said port and receive a bulb; and a bulb spout operatively disposed with respect to the upper end of said feed chain which chain operates outside of said spout, said spout being vertically disposed and of such relatively small diameter with respect to the bulb that said bulb in descending therein creates an air pressure which operating in conjunction with the form of the bulb causes the bulb to right itself and be deposited right side up, said spout being smooth and free of projections whereby the bulb is unobstructed during its descent therein.

3. A bulb planter embodying a bulb hopper having a discharge port therein; a dispensing means yieldingly held beneath said port; a bulb feed chain having bulb buckets secured thereon at spaced intervals; means to cause said feed chain to rotate; and a bulb spout operatively disposed with respect to the upper end of said feed chain, said spout being vertically disposed, smooth and free of projections, whereby the bulb is unobstructed during its descent therein.

In witness whereof I hereunto subscribe my name this 5 day of April, A. D. 1927.

JOHN COLYN.